(12) United States Patent
Booij et al.

(10) Patent No.: US 9,313,135 B2
(45) Date of Patent: Apr. 12, 2016

(54) RADIO COMMUNICATION SYSTEM

(75) Inventors: Wilfred Edwin Booij, Nordby (NO); Øysten Haug Olsen, Asker (NO)

(73) Assignee: Sonitor Technologies AS, Oslo (NO)

( * ) Notice: Subject to any disclaimer, the term of this patent is extended or adjusted under 35 U.S.C. 154(b) by 40 days.

(21) Appl. No.: 14/127,838

(22) PCT Filed: Jun. 20, 2012

(86) PCT No.: PCT/GB2012/051421
§ 371 (c)(1),
(2), (4) Date: Sep. 18, 2014

(87) PCT Pub. No.: WO2012/175957
PCT Pub. Date: Dec. 27, 2012

(65) Prior Publication Data
US 2015/0029924 A1 Jan. 29, 2015

(30) Foreign Application Priority Data
Jun. 22, 2011 (GB) .................................. 1110560.8

(51) Int. Cl.
| H04W 4/00 | (2009.01) |
| H04L 12/825 | (2013.01) |
| H04W 52/02 | (2009.01) |
| H04L 12/18 | (2006.01) |
| H04W 4/04 | (2009.01) |
| H04W 8/00 | (2009.01) |
| H04W 76/04 | (2009.01) |
| H04W 88/06 | (2009.01) |

(52) U.S. Cl.
CPC .............. *H04L 47/25* (2013.01); *H04L 12/189* (2013.01); *H04W 52/0235* (2013.01); *H04W 4/008* (2013.01); *H04W 4/04* (2013.01); *H04W 8/005* (2013.01); *H04W 76/048* (2013.01); *H04W 88/06* (2013.01)

(58) Field of Classification Search
None
See application file for complete search history.

(56) References Cited

U.S. PATENT DOCUMENTS 6,940,392 B2 * 9/2005 Chan ..................... G01S 5/0009
340/10.1
6,963,289 B2 11/2005 Aljadeff et al.
(Continued)

FOREIGN PATENT DOCUMENTS

EP 2151696 2/2010

OTHER PUBLICATIONS

Jin et al. "WiZi-Cloud: Application-Transparent Dual ZigBee-WiFi Radios for Low Power Internet Access", Infocom, 2011 Proceedings IEEE, Apr. 10, 2011, pp. 1593-1601.
(Continued)

*Primary Examiner* — Frank Duong
(74) *Attorney, Agent, or Firm* — O'Shea Getz P.C.

(57) ABSTRACT

A network has wireless access points, each configured for bi-directional communication, using a first radio protocol, with a communication device that has been associated with the access point by an association data exchange. Each access point is also configured to receive, at a first data rate using the first radio protocol, a multicast radio message and to forward the multicast message onto the network. A radio transmitter is configured to send data at a second data rate, using a second radio protocol different from the first radio protocol. A wireless communication unit transmits a multicast radio message at the first data rate using the first radio protocol. It also receives data from the radio transmitter at the second data rate using the second radio protocol and decodes the data.

18 Claims, 3 Drawing Sheets

(56) References Cited

U.S. PATENT DOCUMENTS

| | | | |
|---|---|---|---|
| 7,155,238 B2* | 12/2006 | Katz | ............... G01S 5/0289 340/539.13 |
| 7,295,115 B2 | 11/2007 | Aljadeff et al. | |
| 7,403,108 B2 | 7/2008 | Aljadeff et al. | |
| 7,411,921 B2* | 8/2008 | Strong | ............... G01S 5/02 340/10.1 |
| 7,522,049 B2 | 4/2009 | Aljadeff et al. | |
| 2005/0156711 A1 | 7/2005 | Aljadeff et al. | |
| 2005/0207381 A1 | 9/2005 | Aljadeff et al. | |
| 2009/0273465 A1* | 11/2009 | Shamir | ............... G01S 1/725 340/539.1 |

OTHER PUBLICATIONS

Cisco, "Wi-Fi Location-Based Services 4.1 Design Guide", May 20, 2008.

"AeroScout T2s Tag User Guide", 2009.

* cited by examiner

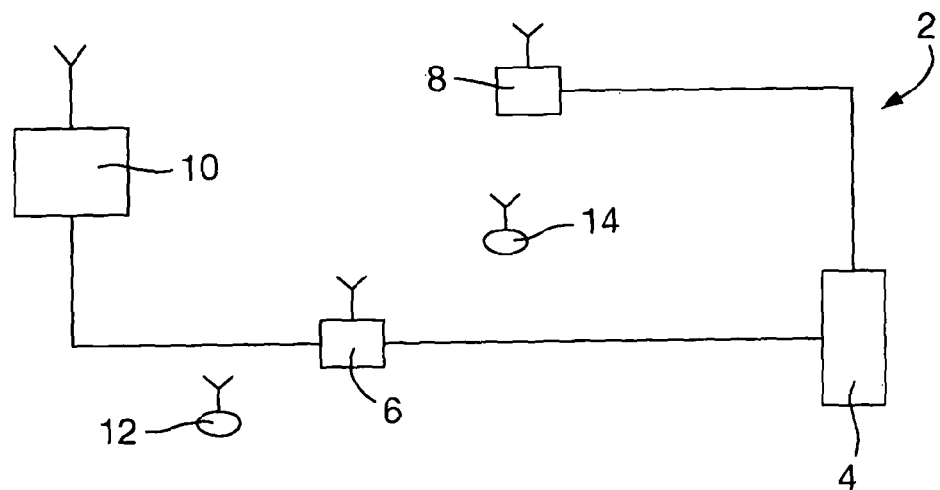
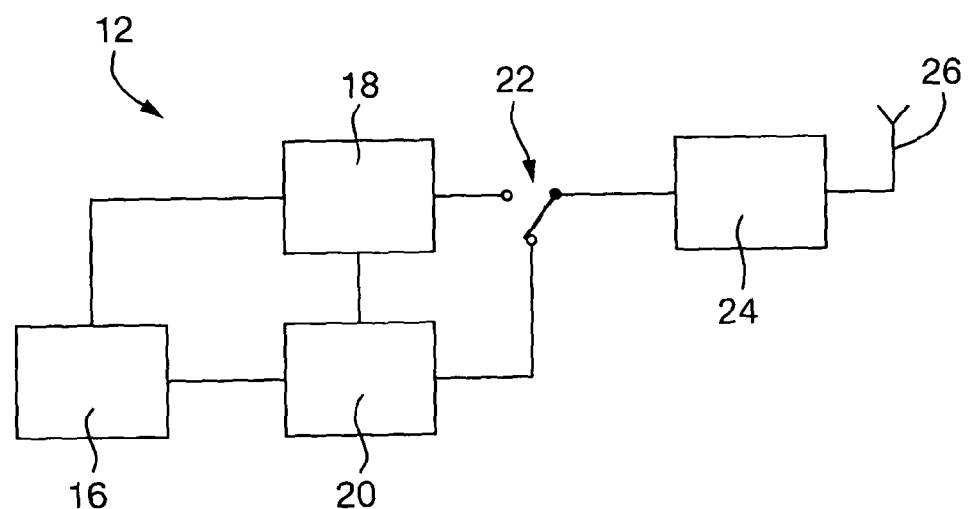

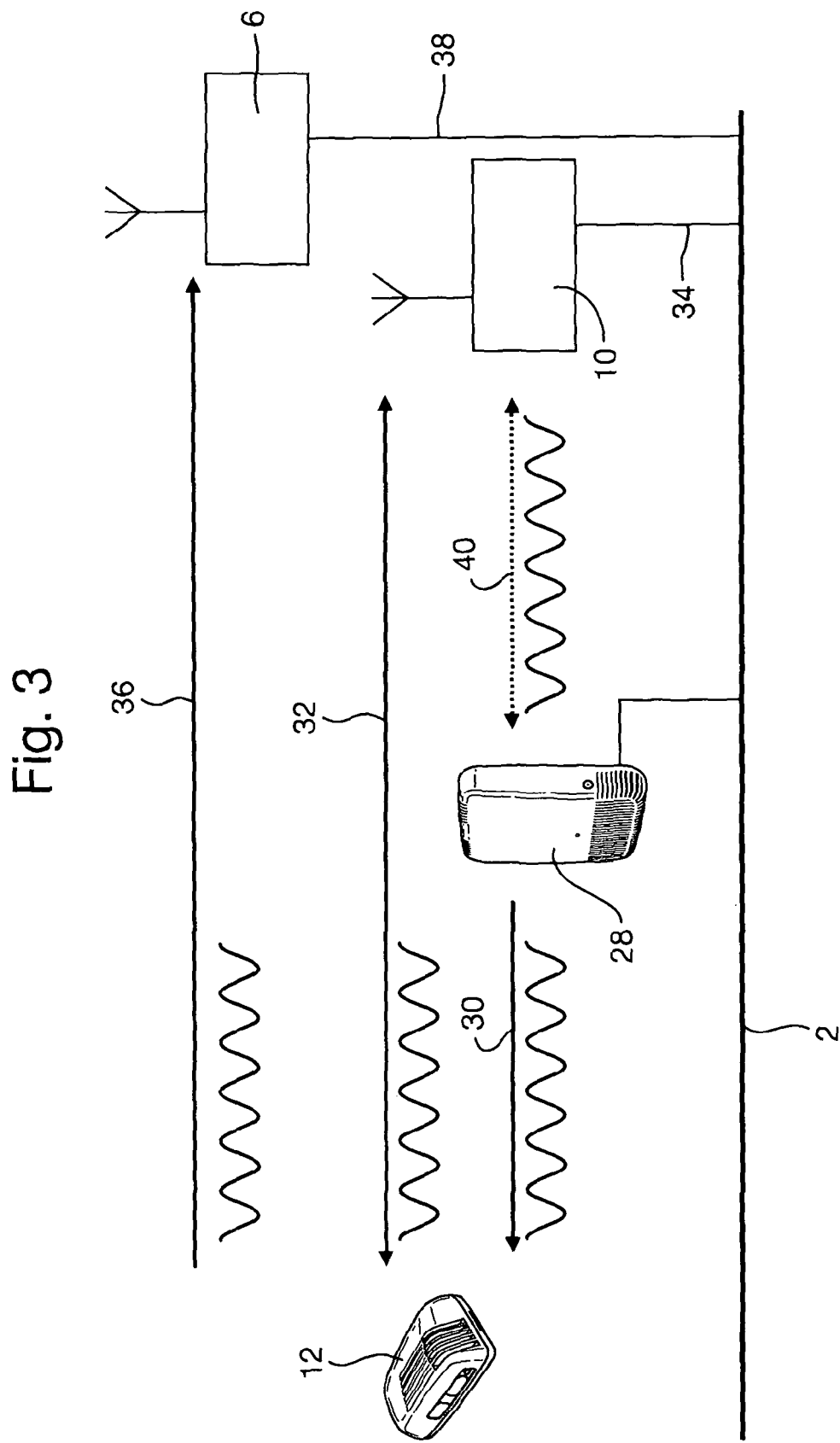

RADIO COMMUNICATION SYSTEM

This application is entitled to the benefit of, and incorporates by reference essential subject matter disclosed in PCT Application No. PCT/GB2012/051421 filed on Jun. 20, 2012, which claims priority to GB 1110560.8 filed Jun. 22, 2011.

BACKGROUND OF THE INVENTION

1. Technical Field

This invention relates to apparatus and methods for radio communication between a wireless unit and one or more static network access points. In some embodiments, the wireless unit may be an environmental or positioning sensor.

2. Background Information

There are many contexts in which it is desirable to transmit information wirelessly from a wireless unit onto a fixed network, rather than requiring a wired connection. For example, the wireless unit may be part of a positioning system, in which it is important for the unit to be mobile, e.g. when it is carried by or attached to a person or item of movable equipment. Alternatively, the wireless unit may be relatively static, but situated in a location to which it is undesirable or impossible to install a wired connection; e.g. a temperature sensor in a building.

Many environments, such as buildings, already contain networks with radio access points; commonly based on one or more of the Institute of Electrical and Electronics Engineers (IEEE) 802.11 standards (commonly known as 'WiFi'). However, associating a wireless unit with such an access point can be slow and power-intensive for the wireless unit, especially when complex authentication protocols are employed. Maintaining association can place an additional power demand on the wireless unit, which may typically be powered by a relatively small battery.

WO 2006/120675 describes an asset transmitter that transmits a presence signal to a wireless local area network (WLAN) system in a broadcast or multicast format that is compatible with IEEE 802.11, but which does not require that the transmitter be associated with an access point. However, if it is desired to send commands to the asset transmitter, so as to control transmission of the presence signal and other parameters, the asset transmitter must include a WLAN receiver, which causes a substantial power drain on the asset transmitter. An attempt to mitigate this problem is described in US 2005/0156711 by only powering a receiver on an asset tag to receive commands during a receive window after each transmission by the asset transmitter. However this can still lead to unnecessarily high power consumption, since the receiver must be powered up even when there are no commands to be received. It also only allows commands to be sent to the asset tag during limited time windows, which may make it impossible to issue a control command in a timely manner. It may also be undesirable or impossible to implement such a proprietary system using standard wireless network infrastructure components.

The present invention seeks to overcome these shortcomings.

SUMMARY OF THE DISCLOSURE

Accordingly, from one aspect, the invention provides a communication system comprising: a network comprising a plurality of first access points, each access point being configured for bi-directional communication, using a first radio protocol, with a communication device that has been associated with the access point by an association data exchange, wherein each access point is further configured to receive, at a first data rate using the first radio protocol, a multicast radio message from a wireless communication unit that is not associated with the access point and to forward the multicast message onto the network; and a radio transmitter configured to send data at a second data rate, using a second radio protocol different from the first radio protocol; and a wireless communication unit comprising radio transmission means configured to transmit a multicast radio message at the first data rate using the first radio protocol, and further comprising radio receiving means configured to receive and decode data from the radio transmitter received at the second data rate using the second radio protocol.

The invention extends to a wireless communication unit comprising radio transmission means configured to transmit a multicast radio message at a first data rate using a first radio protocol, and further comprising radio receiving means configured to receive and decode data from a radio transmitter at a second data rate, using the second radio protocol, different from the first radio protocol.

Thus the wireless unit can receive data using one radio protocol and transmit using another. The second protocol and second data rate are preferably such that data sent by them can be received and decoded for a lower power consumption than would be the case for data sent in a signal of equivalent strength using the first protocol. For example, the second data rate may be lower than the first data rate. In this way, data can be sent to the wireless unit as needed (without being tied to the timing of transmissions from the wireless unit), while placing a lower power demand on the wireless unit than would be the case if it were to receive data using the first protocol.

The second protocol may be optimized for low-power (e.g. battery-based) communication, whereas the first protocol may have been designed for high data rates and/or relatively long range, without such considerations. The applicant has realized that, where access-point infrastructure already exists using the first protocol (e.g. an IEEE 802.11 wireless network), it can be desirable to make use of it for receiving communications from the wireless unit, while trying to minimize the power consumption of the wireless unit.

The first radio protocol preferably conforms to, or is compatible with, one of the IEEE 802.11 standards. However, other protocols could be used, such as Global System for Mobile Communications (GSM), General packet radio service (GPRS), or one of the International Mobile Telecommunications-2000 (IMT-2000) standards. A typical communication device that might be associated with the access point by an association data exchange could be a laptop computer or a mobile telephone.

The access points are preferably connected to one another by a wired network, e.g. Ethernet.

The multicast message (which could be a broadcast message) is preferably as described in WO 2006/120675, the entire contents of which are hereby incorporated by reference, and as used in tags sold by Aeroscout Ltd®.

The second radio protocol may conform to, or be compatible with, at least the physical layer (PHY) defined in one of the IEEE 802.15.4 standards. The second protocol may optionally also comply with the media access layer (MAC) defined therein. Higher level layers, such as one or more of those defined in the ZigBee® standards, may also be implemented, but this is not essential. The skilled person will appreciate that the second radio protocol may instead implement some or all of the layers of other standard protocols, such as ONE-NET, DASH7, Z-Wave®, etc. Alternatively, some or all levels of the second radio protocol may be proprietary.

The second data rate is preferably less than half the first data rate, and may be less than a tenth of the first rate. In some embodiments, the first data rate is at least 1 Mbps and the second data rate is at most 250 kbps. The maximum data rate supported by the second protocol may be less than the minimum data rate supported by the first protocol; and may be less than half or a tenth of this.

Receiving data at a lower data rate than the multicast transmission rate can be advantageous since the complexity of a radio receiver and its power consumption typically scales directly with the required communication bandwidth and a lower second data rate can mean that the wireless unit can be simpler and have a lower overall power consumption. The applicant has come to realize that the same considerations will not typically apply to the first access points, since these will usually have permanent power connections and can bear a higher production cost. In addition, a relatively slow data transmission to the wireless unit provides a higher signal-to-noise ratio and hence a longer transmission range, all else being equal; this may be advantageous in enabling a single radio transmitter, or a small number of installed transmitters, to cover a large area, such as an entire hospital building or complex.

The effective transmission range of the radio transmitter that is configured to transmit using the second protocol may be greater than the transmission range of the access points when communicating with an associated communication device; it may, for example, be more than twice or ten times as far as a clear line-of-sight distance. This will typically be the case when a simple star network topology is used for communications under the second protocol.

Typically, when the prior art uses a protocol such as IEEE 802.15.4 or a proprietary protocol operating in the ISM (industrial, scientific and medical) bands, the effective transmission power is relatively low, and substantially lower than that used in a typical IEEE 802.11 transmission. However, in some embodiments of the present invention, the second protocol data is preferably transmitted at a power level resulting in a communication range equal to or higher than that used in the transmissions from the access points. This can enable wide coverage for data from the radio transmitter using the second data protocol, and a low infrastructure density. It can also reduce the overall bandwidth over the second protocol.

The second protocol radio transmitter is preferably connected to a common wired network with the access points; e.g. an Ethernet network. It may be housed in the same unit as one of the access points, or may be physically separate from any of the access points.

The system may comprise a plurality of radio transmitters configured to send data at the second data rate using the second radio protocol. These may form a network of second access points for devices communicating using the second protocol. Each of these second access points may also comprise a radio receiver, for two-way communication using the second protocol, and may be connected to a wired network.

The wireless communication unit may be configured to act as a node within a tree or mesh network topology of nodes that are configured to send and/or receive data using the second radio protocol. A network of second access points and/or such wireless communication units may be configured as a tree or mesh network. This can enable the wireless communication unit to transmit at a lower power setting than if it had to communicate directly with the second-protocol radio transmitter (e.g. a star network topology).

Other devices such as wireless sensor units may also be nodes in a radio network using the second protocol. Wireless nodes, such as the wireless communication unit, in the network may be configured to forward a message from a sensor node to another wireless node using the second radio protocol, and so on, until an access point to a wired network is reached. Such a design can reduce the number of cabled access points required to provide coverage of a given area, such as a hospital building.

The system preferably comprises processing means, such as a server, configured to receive and process the forwarded multicast message, and to control the sending of the data from the radio transmitter.

The data sent using the second protocol could take any form but in one set of embodiments it comprises a control message and the wireless communication unit is configured to execute a function in response to receiving said control message.

The control message is not limited to any particular type of instruction. Various different types of control message may be transmitted. A control message may address one or more specific wireless transmitter units, or may be broadcast to all transmitter units within range. One example of a control message is an instruction to a wireless unit to change the rate at which it transmits multicast messages, or to suspend transmissions. Such an instruction may be issued when the wireless unit is determined to be in a particular region, such as in an area of a hospital containing equipment that may be sensitive to radio interference.

The data sent to the wireless unit using the second protocol may comprise a partial or complete instruction set or firmware update for a processing unit inside the wireless unit. Although such instructions sets typically require the communication of relatively large amounts of data and will therefore take a relatively large amount of time to transmit over the second data protocol, such updates are typically infrequent and will therefore not lead to a substantial amount of energy consumption.

The radio receiving means in the wireless unit preferably comprises a radio receiver. The receiver may only be powered up at intervals, so as to conserve energy. Second-protocol data may therefore be issued repeatedly over a period of time, to ensure that their transmission coincides with a powered-up period for the wireless unit, or may be repeated until an acknowledgement is issued by the wireless unit, e.g. contained in a multicast radio message using the first protocol, or in an acknowledgement message using the second protocol.

More generally, the wireless communication unit may be configured to have a sleep mode and a wake mode, whereby at least some circuitry in its processor and/or radio receiver and/or radio transmitter is inactive in sleep mode, so as to reduce the power consumption of the unit. The wireless unit may be configured to switch from sleep mode to wake mode on receiving a wake signal using the second radio protocol. Alternatively or additionally it may be configured to switch from sleep mode to wake mode on receiving a magnetic, optical or ultrasonic signal, or a radio signal using a third radio protocol different from the first and second radio protocols. Such a wake mechanism can consume very little power while monitoring for a wake signal. Use of a wake signal can result in power savings while retaining a low latency response by the wireless communication unit The access points are typically static, as preferably is the radio transmitter (or transmitters) configured to send data using the second protocol. Each access point preferably receives power from a wired connection, e.g. a power supply cable. The wireless communication unit supports wireless communication. It might also have a wired connection, e.g. to an electrical power supply. Preferably, however, it contains no wired connections for communication or power. It may be powered from environment energy, such as sunlight or vibrations, or may contain a battery.

The wireless unit may be generally static, e.g. fixed to an immovable object such as the wall of a building, or may be generally mobile, e.g. configured to be carried by, worn or attached to a movable object such as a human being, or a portable item of equipment.

The system may comprise a plurality of such wireless units. The multicast radio message preferably includes identification information that distinguishes the wireless unit transmitting the message from other wireless units.

In one set of embodiments, the wireless unit comprises, or is in wired or wireless communication with, an environmental sensor and is configured to include information derived from the sensor in the multicast radio message. The sensor may sense temperature, pressure, fluid flow, humidity, light, noise, or any other measurable quantity. The unit may comprise, or be in communication with, several such sensors measuring different variables.

In another set of embodiments, the wireless unit transmits information relating to the relative or absolute position of the unit, or information from which the position can be derived, in the multicast radio message. Such information may be derived from a signal received from the radio transmitter configured to transmit control messages, such as one or more of the strength of the signal, its time of receipt, and the identity of the transmitter.

In some embodiments, the wireless unit comprises an ultrasound receiver, and may be configured to respond to ultrasound signals transmitted by an ultrasound transmitter positioned in an area. A wireless tag having an ultrasound receiver and a radio transmitter, for use in a wireless location system, is described in EP 2151696. However, the arrangement in EP 2151696 suffers from having no means for the wireless tag conveniently and power-efficiently to receive data such as control commands.

The wireless unit may be configured to determine or transmit information relating to its position using one or more radio and/or ultrasound signals. The wireless unit may transmit or receive simultaneously-transmitted radio and ultrasound signals, and the difference in arrival time of the two signals may be used by the wireless unit or by a server to determine position information relating to the wireless unit.

The wireless unit may comprise a clock. A control message may then include clock synchronization information, so that the clock on the wireless unit can be synchronized to time information available on the network.

Preferably, the system comprises an ultrasound transmitter that has access to time information synchronized with the wireless unit. The ultrasound transmitter may, for example, be on the network. An ultrasound signal may then be transmitted containing coded information relating to its time of transmission. If the wireless unit is configured to receive the ultrasound signal, it can determine an accurate time of arrival of the signal at the wireless unit, and can transmit information relating to the time of transmission and the time of arrival (such as the calculated time of flight) in a multicast radio transmission. An access point that receives the multicast transmission can forward the information to a processor located on the network, which can use it to determine position information about the wireless unit. If the system comprises a plurality of such ultrasound transmitters, in range of the wireless unit, a trilateration algorithm may be used to determine an accurate position estimate for the unit.

Knowing the times of flight of the ultrasound signals allows for more efficient position estimation than if just the times of arrival are known, when time difference of arrival (TDOA) has to be used. By providing a power-efficient clock synchronization mechanism, the present invention enables these advantageous time-of-flight calculations without the need to install and power low-frequency exciters, as taught in EP 2151696.

Clock synchronization may need to be performed only relatively infrequently, e.g. once every minute, or once every hour, resulting in only a very modest power drain on the wireless unit.

Although multicast messages using the first protocol are envisaged as being the primary mechanism for transmitting information from the wireless unit onto the network, the wireless unit may also comprise a radio transmitter configured to transmit a message using the second radio protocol. Such transmission may be at the second data rate, or a different rate. The wireless unit might, for example, be configured to use the second protocol to transmit an acknowledgement of data received using the second protocol (e.g. handshaking), and/or for time synchronization. Preferably an antenna connected to the radio transmitter configured to send a control message is also used to receive a message from the wireless unit using the second radio protocol.

The first and second radio protocols may operate in the same or overlapping radio spectra, e.g. at 2.4 GHz. However, this is not essential and in some embodiments the second protocol may use a sub-GHz frequency range. The wireless unit may use the same antenna both for transmitting a multicast message using the first radio protocol and for receiving data using the second protocol. It may use the same power amplifier for both protocols. Such reuse can reduce the size and cost of the wireless unit.

BRIEF DESCRIPTION OF THE DRAWINGS

Certain preferred embodiments of the invention will now be described, by way of example only, with reference to the accompanying drawings, in which:

FIG. 1 is a schematic drawing of a system embodying the invention;

FIG. 2 is a schematic drawing of a wireless communication unit according to the invention;

FIG. 3 is a diagram showing various possible routes for data communication between devices embodying the invention.

DETAILED DESCRIPTION OF THE INVENTION

Figure 4:
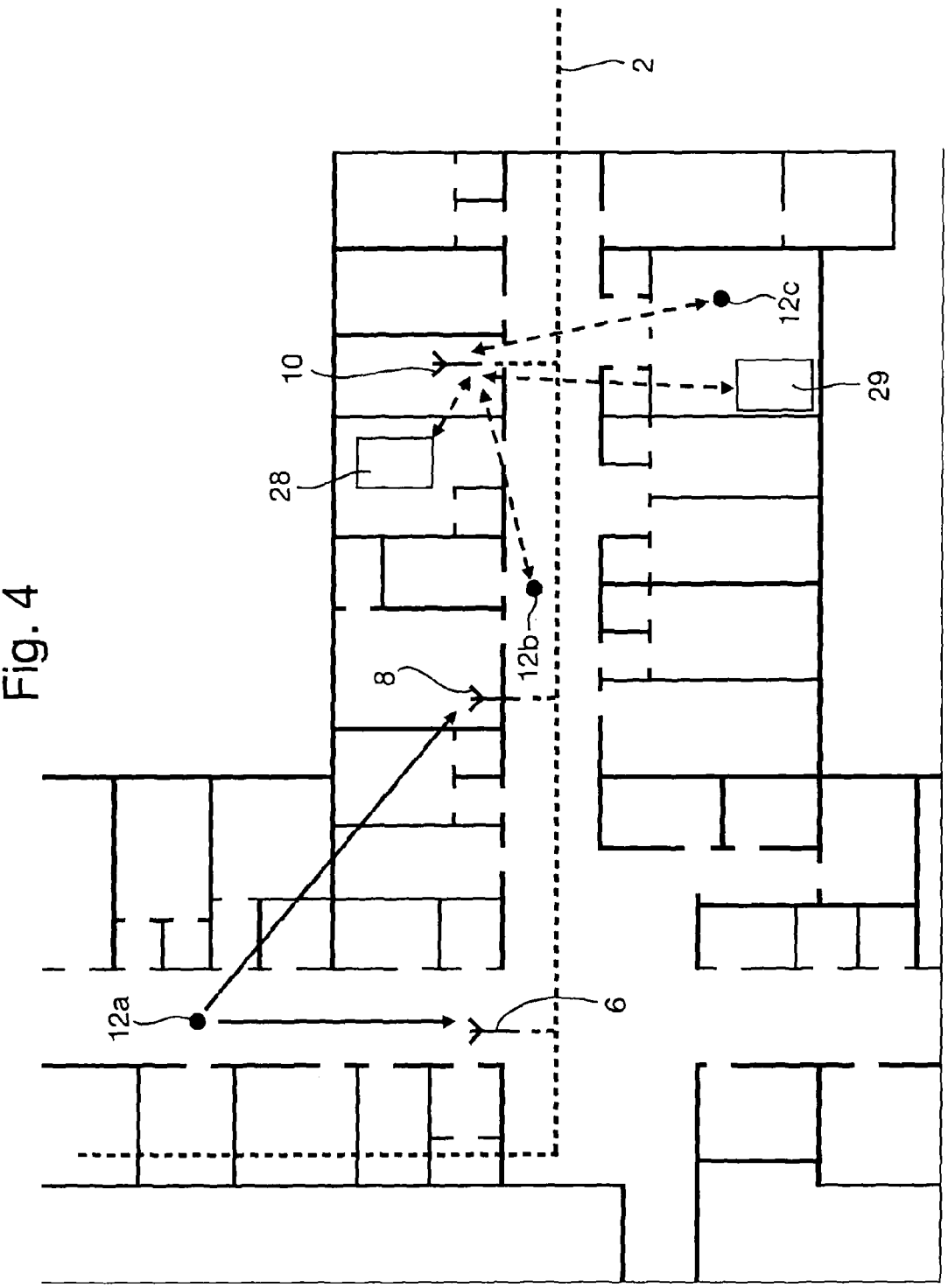
FIG. 4 is a schematic floor-plan of an installed system embodying the invention.

FIG. 1 shows an Ethernet network 2 connecting a server 4 to a first wireless access point 6 and a second wireless access point 8. These access points 6, 8 support one or more of the IEEE 802.11 standards, such as 802.11b, 802.11g and 802.11n. They are also configured to receive 802.11 multicast messages and to forward these onto the network 2. The network 2 also includes a radio transmitter 10 that supports transmissions based on the IEEE 802.15.4 PHY and MAC layers. It can transmit these at relatively high powers.

A first wireless unit 12 and a second wireless unit 14 are in the vicinity of the network 2. All the components of FIG. 1 may be within a single building or complex of buildings, such as a hospital site. Of course, the network topology may be more complex than this, and may include more access points, radio transmitters and wireless units; for example, some or all of the access points and wireless units may be members of one or more mesh or tree radio networks.

The first wireless unit 12 is in range of the first access point 6, while the second wireless unit 14 is in range of both the first and second access points 6, 8.

FIG. 2 shows some of the components of the wireless unit 12. A chip generator 16 supplies a sequence of "0"s and "1"s to a ZigBee® system-on-chip (SoC) 18, such as a CC2520 from Texas Instruments®. The chip generator 16 and Zig-Bee® SoC 18 are also both connected to an I/Q modulator 20, such as a Max2721 from Maxim Integrated Products®. A switch 22 selectively connects an input of the ZigBee® SoC 18 or the output of the I/Q modulator 20 to a power amplifier 24, such as a CC2591 from Texas Instruments®. The power amplifier 24 is connected to an antenna 26.

The wireless unit 12 may also comprise one or more environmental sensors (not shown) or an ultrasound transducer (not shown).

FIG. 3 shows an 802.11 access point 6, an 802.15.4 transceiver 10 and an ultrasonic base unit 28, all connected to an Ethernet network 2. A wireless unit 12 can communicate with each of these components, as illustrated in the following scenarios.

A first scenario is a hybrid position-determining mechanism using the 802.15.4 RF network. The ultrasonic base unit 28 sends a zone identifier using ultrasound communication 30. The wireless unit 12 receives the ultrasonic signal and communicates a response, including the zone identifier and a wireless-unit identifier, using the 802.15.4 RF network 32. This response message is routed 34 by the 802.15.4 transceiver 10 to the wired network 2. A server (not shown) uses the response to determine what zone the wireless unit 2 is located in.

A second scenario is a hybrid position-determining mechanism using the 802.11 RF network. The ultrasonic base unit 28 sends a zone identifier using ultrasound communication 30. The wireless unit 12 receives the ultrasonic signal and broadcasts a response, including the zone identifier and a wireless-unit identifier, over the 802.11 RF network 36. This response message is received by the 802.11 access point 6 and is routed 38 to the wired network 2. A server (not shown) uses it to determine what zone the wireless unit 2 is located in.

A third scenario is an RF position-determining mechanism using the 802.15.4 RF network. The wireless unit 12 transmits a message over the 802.15.4 RF network 32. This message is routed by the 802.15.4 transceiver 10 to the wired infrastructure 2. A server (not shown) uses information relating to the message (such as timing information) to determine the location of the wireless unit 2.

A fourth scenario is an RF position-determining mechanism using the 802.11 RF network. The wireless unit 12 broadcasts a message over the 802.11RF network 36. This message is received by the 802.11 access point 6, which routes it to the wired infrastructure 2. A server (not shown) uses information relating to the message (such as timing information) to determine the location of the wireless unit 2.

Wireless configuration and control of the ultrasonic base unit 28 is possible over the 802.15.4 RF network 40.

Similarly, wireless configuration and control of the wireless unit 12 is possible using the 802.15.4 RF network 32.

FIG. 4 shows the floor-plan of a hospital ward. Two 802.11 access points 6, 8 are installed on the walls at two points along a corridor. They are connected to a wired Ethernet network 2. An 802.15.4 transceiver 10 is also installed in a convenient location, such as in a room, and is also connected to the Ethernet network 2. Its coverage will typically extend much further than the coverage of each of the 802.11 access points 6, 8, so it may only be necessary to have one 802.15.4 transceiver 10 for an entire ward or wing of the hospital.

Two ultrasonic base units 28, 29 are installed in respective rooms. In practice, there may be many more base units in different rooms and/or multiple base units in the same room. In this example the ultrasonic base units 28, 29 are not connected to the Ethernet network 2, although they may be. The ultrasonic base units 28, 29 transmit zone ID information periodically; this zone ID information may be a number unique to the base unit. Its coverage may be all or just part of a room or area.

Three wireless units 12a, 12b, 12c are attached to respective assets, such as patients, doctors or portable equipment.

The wireless units 12a, 12b, 12c may receive ultrasonic signals from the ultrasonic base units 28, 29 when they are in range of them, and may relay information related to the signals by 802.11 broadcast and/or by 802.15.4 communication, as previously described.

In this way, a system for tracking can be implemented which can harness existing 802.11 infrastructure 6, 8, 2 for receiving information from wireless units 12a, 12b, 12c, but which can also use an 802.15.4 transceiver 10 for communicating messages, such as control commands, to the wireless units 12a, 12b, 12c.

Although this invention has been shown and described with respect to the detailed embodiments thereof, it will be understood by those skilled in the art that various changes in form and detail thereof may be made without departing from the spirit and the scope of the invention.

What is claimed is:

1. A positioning system comprising:
    a network comprising a plurality of first access points, each access point being configured for bi-directional communication, using a first radio protocol, with a communication device that has been associated with the access point by an association data exchange, wherein the first radio protocol conforms to, or is compatible with, at least one of the IEEE 802.11 standards, and wherein each access point is further configured to receive, at a first data rate using the first radio protocol, a multicast radio message from a wireless communication unit that is not associated with the access point and to forward the multicast message onto the network;
    a first radio transmitter configured to send data comprising a control message, addressed to one or more specific wireless communication units, at a second data rate which is lower than the first data rate, using a second radio protocol which is different from the first radio protocol; and
    a wireless communication unit:
        comprising a further radio transmitter configured to transmit a multicast radio message at the first data rate using the first radio protocol, wherein the multicast radio message comprises (i) identification information relating to the wireless communication unit, and (ii) information relating to the position of the wireless communication unit, or information from which the position of the wireless communication unit can be derived;
        comprising a radio receiver configured to receive and decode a control message from said first radio transmitter, received at the second data rate using the second radio protocol; and
        being configured to execute a function in response to receiving the control message; and
    a server configured to:
        receive and process the multicast message from the wireless communication unit, forwarded to the server by one of the first access points, to determine the position of the wireless communication unit; and
control the sending of data from the first radio transmitter.

2. The positioning system of claim 1, wherein the wireless communication unit comprises a radio transmitter configured to transmit a message using the second radio protocol.

3. The positioning system of claim 1, wherein the wireless communication unit is configured to communicate (i) a wireless-communication-unit identifier, and (ii) a zone identifier, in said multicast radio message.

4. The positioning system of claim 1, wherein the first and second radio protocols operate in the same, or overlapping, radio spectrum ranges.

5. The positioning system of claim 1, wherein the wireless communication unit comprises a power amplifier and an antenna and is configured to use the antenna and power amplifier for transmitting a multicast message using the first radio protocol and for receiving data using the second protocol.

6. The positioning system of claim 1, wherein the first access points and the first radio transmitter are connected to one another by a wired network.

7. The positioning system of claim 1, wherein the second radio protocol conforms to, or is compatible with, the physical layer defined in one of the IEEE 802.15.4 standards.

8. The positioning system of claim 1, wherein a maximum data rate supported by the second protocol is less than a minimum data rate supported by the first protocol.

9. The positioning system of claim 1, wherein an effective transmission range of the first radio transmitter is greater than effective transmission ranges of the first access points when each access point is communicating with a communication device associated with the access point.

10. The positioning system of claim 1, wherein the wireless unit comprises a clock, wherein the first radio transmitter is configured to send clock synchronisation information at the second data rate using the second radio protocol, and wherein the wireless unit is configured to use the clock synchronisation information to synchronise its clock.

11. The positioning system of claim 1, comprising a plurality of radio transmitters configured to send data at the second data rate using the second radio protocol, and arranged to form a network of second access points for devices communicating using the second protocol, wherein each of the second access points also comprises a radio receiver, for two-way communication using the second protocol, and wherein the network of second access points is configured as a tree or mesh network.

12. The positioning system of claim 1, wherein the wireless unit comprises an ultrasound receiver, and is configured to respond to ultrasound signals transmitted by an ultrasound transmitter positioned in an area.

13. The positioning system of claim 1, wherein the wireless communication unit is configured to be carried by, worn by or attached to a movable object.

14. A wireless communication unit comprising:
a radio transmitter configured to transmit a multicast radio message at a first data rate using a first radio protocol to a plurality of access points, wherein the wireless communication unit is not associated with any of the access points, wherein the first radio protocol conforms to, or is compatible with, at least one of the IEEE 802.11 standards, and wherein the multicast radio message includes (i) identification information relating to the wireless communication unit, and (ii) information relating to the position of the wireless communication unit, or from which the position of the wireless communication unit can be derived; and
a radio receiver configured to receive and decode a control message, addressed to the wireless communication unit, from a remote radio transmitter at a second data rate which is lower than the first data rate, using a second radio protocol which is different from the first radio protocol, the wireless communication unit being configured to execute a function in response to receiving the control message.

15. The wireless communication unit of claim 14, comprising a clock, being configured to receive clock synchronisation information from the radio transmitter at the second data rate using the second radio protocol, and being further configured to use the clock synchronisation information to synchronise the clock.

16. A method comprising:
a wireless communication unit transmitting a multicast radio message at a first data rate to a WiFi access point with which the wireless communication unit is not associated, the multicast radio message comprising (i) identification information relating to the wireless communication unit, and (ii) information relating to the position of the wireless communication unit, or information from which the position of the wireless communication unit can be derived;
a server receiving (i) the identification information and (ii) the information relating to the position of the wireless communication unit, or information from which the position of the wireless communication unit can be derived, and using said information to determine the position of the wireless communication unit;
the server causing a radio transmitter to send a control message addressed to the wireless communication unit, at a second data rate which is lower than the first data rate, using a non-WiFi radio protocol; and
the wireless communication unit executing a function in response to receiving said control message.

17. The method of claim 16, wherein the control message includes synchronization information, the method further comprising using said synchronization information to synchronize the wireless communication unit.

18. The method of claim 16, wherein the multicast radio message includes (i) an identifier of the wireless communication unit and (ii) a zone identifier.

* * * * *